United States Patent [19]
Berchtold

[11] Patent Number: 4,601,111
[45] Date of Patent: Jul. 22, 1986

[54] GEAR TOOTH TEST FEELER

[75] Inventor: Nikolaus Berchtold, Zurich, Switzerland

[73] Assignee: Maag Gear-Wheel & Machine Company, Ltd., Zurich, Switzerland

[21] Appl. No.: 737,164

[22] Filed: May 23, 1985

[30] Foreign Application Priority Data

May 28, 1984 [CH] Switzerland ............ 2646/84

[51] Int. Cl.$^4$ ............................................. G01B 3/22
[52] U.S. Cl. ......................................... 33/559; 33/556; 33/DIG. 1; 73/105; 324/207
[58] Field of Search ................ 33/556, 559, 561, 560, 33/558, 503, 179.5 R, 179.5 A, 179.5 E, DIG. 1; 73/105; 324/207, 208

[56] References Cited

U.S. PATENT DOCUMENTS

| 3,943,633 | 3/1976 | Ruffner . | |
|---|---|---|---|
| 4,375,723 | 3/1983 | McMurtry | 33/559 |
| 4,441,257 | 4/1984 | Golinelli et al. | 33/561 |
| 4,473,951 | 10/1984 | Golinelli et al. | 33/178 E X |
| 4,532,713 | 8/1985 | Feichtinger | 33/559 |

FOREIGN PATENT DOCUMENTS 2364918 9/1976 Fed. Rep. of Germany .
2356030 5/1978 Fed. Rep. of Germany .
2850875 5/1982 Fed. Rep. of Germany .
3302016 6/1984 Fed. Rep. of Germany .

Primary Examiner—William D. Martin, Jr.
Attorney, Agent, or Firm—Werner W. Kleeman

[57] ABSTRACT

The gear tooth test feeler contains a sensing lever pivotally journalled in a carrier member by means of a cross-spring joint. The cross-spring joint generates a counter-force which increases in proportion to the angular deflection of the sensing lever. Two rocking levers are arranged on opposite sides of the sensing lever. The two rocking levers are positioned between the carrier member and the sensing lever by further pivot bearings and stop members such that the rocking levers maintain the sensing lever in a central position and such that the sensing lever entrains one of the rocking levers whenever the sensing lever deflects while the other rocking lever retains its initial position and vice-versa. Two permanent magnets fastened to the sensing lever exert a magnetic force of attraction upon each of the ferrous rocking levers. When the sensing lever deflects, one of the permanent magnets moves away from its associated rocking lever, so that the magnetic force of attraction exerted upon the rocking lever diminishes. The algebraic addition of this diminishing magnetic force of attraction and the increasing counter-force of the cross-spring joint produces a constant contact pressure of a feeler tip of the sensing lever against a gear tooth flank being sensed throughout its deflection displacement path. The sensing lever is deflectable out of its central position in both directions without requiring a switching operation for selectively sensing right hand and left hand gear tooth flanks.

11 Claims, 4 Drawing Figures

GEAR TOOTH TEST FEELER

CROSS REFERENCE TO RELATED APPLICATIONS

This application is related to my co-pending, commonly assigned U.S. patent applications Ser. No. 06/680,363, filed Dec. 11, 1984 and entitled "GEAR MEASURING FEELER" and Ser. No. 06/682,089, filed Dec. 17, 1984 and entitled "TOOTH FLANK PROFILE MEASURING APPARATUS CONTAINING A FEELER FOR DETERMINING THE SURFACE ROUGHNESS OF A TOOTH FLANK"- now U.S. Pat. Ser. No. 4,552,014.

BACKGROUND OF THE INVENTION

The present invention broadly relates to a gear tooth measuring or test feeler for a gear tooth measuring or testing machine and, more specifically, pertains to a new and improved construction of a gear tooth test feeler having a carrier or support member with a deflectable sensing lever.

Generally speaking, the gear tooth measuring or test feeler of the present invention is for a gear tooth measuring or testing machine and comprises a carrier or support member which contains a deflectable sensing lever. The deflectable sensing lever carries a feeler tip on one of its ends and a measurement system on its other end. A pivot bearing means for the sensing lever is fastened to the carrier member and generates a counter-force which increases in proportion to the deflection of the sensing lever.

In other words, the gear tooth test feeler of the present invention is of the type comprising a sensing lever which defines a plane of deflection and has a first end, a second end, a region or intermediate region adjacent to the second end, a first side, a second side opposite to the first side and a central or neutral position as well as a feeler tip mounted on the first end of the sensing lever, a measuring system mounted on the second end of the sensing lever, a carrier or support member, first pivot bearing means for deflectably mounting the sensing lever within the carrier member to perform a deflection substantially in the plane of deflection. The first pivot bearing means is of a construction which generates a counter-force which increases in proportion to the deflection of the sensing lever.

A gear tooth measuring or test feeler of this type is known from the German Pat. No. 2,364,918, published Sept. 2, 1976, and has a cross-spring joint comprising two mutually perpendicularly arranged leaf springs as its pivot bearing means. Only one left hand or only one right hand gear tooth flank at a time can be sensed or tested with this feeler and for this purpose the feeler must be biased or preloaded in a predetermined direction of deflection. A rotatable ring is provided for performing this biasing or preloading which comprises a camming surface defined by a skew plane which acts upon flat springs which press the test feeler into one or another of two terminal positions.

If the gear tooth flank to be measured or tested now presses against the feeler tip in the opposite direction, then the sensing lever is subjected to a pivoting motion within its deflection plane in the direction of a central or neutral position and in opposition to the spring force of one of the two flat springs. This situation is sensed by the measuring system.

Since this known gear tooth measuring or test feeler must be switched manually from operation for testing one handedness of gear tooth flank to operation for testing the other, it cannot be employed in automatic gear tooth measuring or testing machines. While the provision of a remote-controlled drive for the adjustment ring provided for biasing or preloading the flat springs is conceivable, space restrictions preclude it.

With this known test feeler measurements cannot be made commencing from the central or neutral position of the sensing lever since the flat springs and the leaf springs of the cross-spring joint generate a zero force in the neutral position and an increasingly greater force as the angular deflection increases, which varies approximately according to the dash line curve K in the force-displacement diagram of FIG. 1. In order that reproducible measurement or testing results can be achieved at all with this known gear test feeler, the gear test feeler must initially be deflected out of the central or neutral position in one direction or the other with a predetermined degree of biasing or preloading.

The curve K also shows that the contact pressure of the feeler tip of this known gear tooth test feeler is strongly dependent upon the deflection displacement. Measurements with variable contact pressure produce considerable errors, especially with rough gear tooth flank surfaces, if a measurement precision of 1 $\mu$m is to be attained. Due to the measurement pressure increasing with increasing deflection, the known gear tooth test feeler can only supply relative values which must be individually interpreted on the basis of calibration curves and the like.

This measurement procedure is unsuitable for automatic gear tooth measuring or testing machines in which the evaluation of the measurement is performed by a computer, since the computer should be supplied with absolute values in as far as possible. This poses the prerequisite that measurement be performed throughout the entire measurement region with as nearly as possible the same measurement pressure, which is not possible with this known gear tooth test feeler for the reasons discussed above.

Furthermore, a well-defined central or neutral position is also not readily attainable with this known gear tooth test feeler, since the terminal positions of its sensing lever are determined by elastic stop members.

SUMMARY OF THE INVENTION

Therefore, with the foregoing in mind, it is a primary object of the present invention to provide a new and improved construction of a gear tooth measuring or test feeler which does not exhibit the aforementioned drawbacks and shortcomings of the prior art constructions.

Another and more specific object of the present invention aims at providing a new and improved construction of a gear tooth measuring or test feeler of the previously mentioned type with which measurements can be performed from a constant neutral position of the feeler over the entire measurement path with a constant measurement pressure without requiring switching from one handedness of gear tooth flank operation to another.

Yet a further significant object of the present invention aims at providing a new and improved construction of a gear tooth test feeler of the character described which is relatively simple in construction and design, extremely economical to manufacture, highly reliable in operation, and not readily subject to breakdown or malfunction and requires a minimum of maintenance and servicing.

Now in order to implement these and still further objects of the invention, which will become more readily apparent as the description proceeds, the gear tooth measuring or test feeler of the present invention is manifested by the features that two rocking levers mounted on mutually opposite sides of the sensing lever in its deflection plane in the region adjacent to the end of the sensing lever carrying the measurement system are each positioned between the carrier or support member and the sensing lever by a pivot bearing means and a stop member such that they maintain the sensing lever in a central or neutral position and such that the sensing lever entrains one of the rocking levers whenever the sensing lever deflects, while the other rocking lever retains its initial position, and vice-versa. Two magnets are both fastened to the sensing lever or to one or the other of the two rocking levers and exert a magnetic force of attraction opposite in sense to the counter-force upon the rocking lever confronting them.

In other words, the present invention is manifested by the features that it comprises a first rocking lever and a second rocking lever, the first rocking lever being arranged on the first side of the sensing lever and at the region of the sensing lever adjacent the second end of the sensing lever and substantially coincident with the plane of deflection, while the second rocking lever is arranged on the second side of the sensing lever and at the region of the sensing lever adjacent the second end of the sensing lever and substantially coincident with the plane of deflection. Each of the first rocking lever and the second rocking lever has an initial position. Second pivot bearing means are provided for the first rocking lever and third pivot bearing means are provided for the second rocking lever. A first stop member is provided for the first rocking lever and a second stop member is provided for the second rocking lever. The first rocking lever is positioned between the carrier member and the sensing lever by the second pivot bearing means and the first stop member, and the second rocking lever is positioned between the carrier member and the sensing lever by the third pivot bearing means and the second stop member such that the first rocking lever and the second rocking lever maintain the sensing lever in neutral position and such that when the sensing lever performs the deflection out of said neutral position, the sensing lever selectively either entrains the first rocking lever and leaves the second rocking lever in the initial first position thereof or entrains said second rocking lever and leaves the first rocking lever in the initial position thereof. A first magnet member and a second magnet member are provided, the first magnet member and the second magnet member being selectively both mounted on the sensing lever for exerting a magnetic force of attraction counter to the counter-force upon respective ones of the first rocking lever and the second rocking lever or individually mounted on respective ones of the first rocking lever and the second rocking lever for exerting the magnetic force of attraction upon the sensing lever.

The gear tooth test feeler according to the present invention is devoid of the flat springs found in the prior art. A pivot bearing means comprising leaf springs is, however, provided which generates an increasing counter-force as the deflection of the test feeler increases. In the initial position, both magnets exert equally great magnetic forces of attraction upon the rocking levers confronting them which, through the stop members, maintain the rocking levers in their initial positions and therefore retain the sensing lever in a precisely defined central or neutral position. If the sensing lever is deflected, the counter-force generated by the pivot bearing means increases, but the magnetic force of attraction effective between the sensing lever and that rocking lever of the rocking levers which retains its initial position under deflection of the sensing lever simultaneously diminishes such that the diminishing force of attraction and the increasing counter-force algebraically add to a resultant force which is constant over the entire deflection displacement path. This relation between the forces can be appreciated in FIG. 1, where M represents the force of attraction of one magnet while R represents the resultant force. The curves A and M are represented in idealized form, since in reality a quadratic dependence always exists between the force and the displacement. However, a contact pressure of the feeler tip which is substantially constant over the entire deflection displacement path results, as can be readily appreciated from the measurement results represented in FIG. 2 which were achieved with a gear tooth test feeler constructed according to the invention. These measurement or test results furthermore show that the constant measuring pressure is achieved after a slight deflection from the central or neutral position of about only 5 $\mu$m displacement.

In one embodiment of the invention, a predetermined spacing between the magnets and the rocking levers immediately confronting them is maintained by spacer members and a predetermined initial point is thereby selected upon the curve M which ensures that the algebraic addition of the magnetic force of attraction and the counter-force will produce the full measuring pressure even at a minimal deflection displacement.

In a further embodiment of the invention, non-magnetic balls or pins (e.g. of ceramic material) are selected as spacer members which do not influence the magnetic field and maintain the selected distance or spacing very accurately.

In yet a further embodiment of the invention, the central or neutral position of the sensing lever can be very exactly adjusted by adjustment screws and, if necessary, compensated or re-adjusted.

In yet another embodiment of the invention, which is intended for a gear tooth test feeler in which the pivot bearing means of the sensing lever comprises a leaf spring parallelogram linkage or four-bar linkage, a compensation magnet is provided to compensate the diminishing force of attraction of the magnets during deflection should the counter-force generated by the leaf springs not be sufficient. The compensation magnet generates an additional counter-force in order that the variation of the contact pressure throughout the deflection displacement path shown in FIG. 2 may result.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 3:
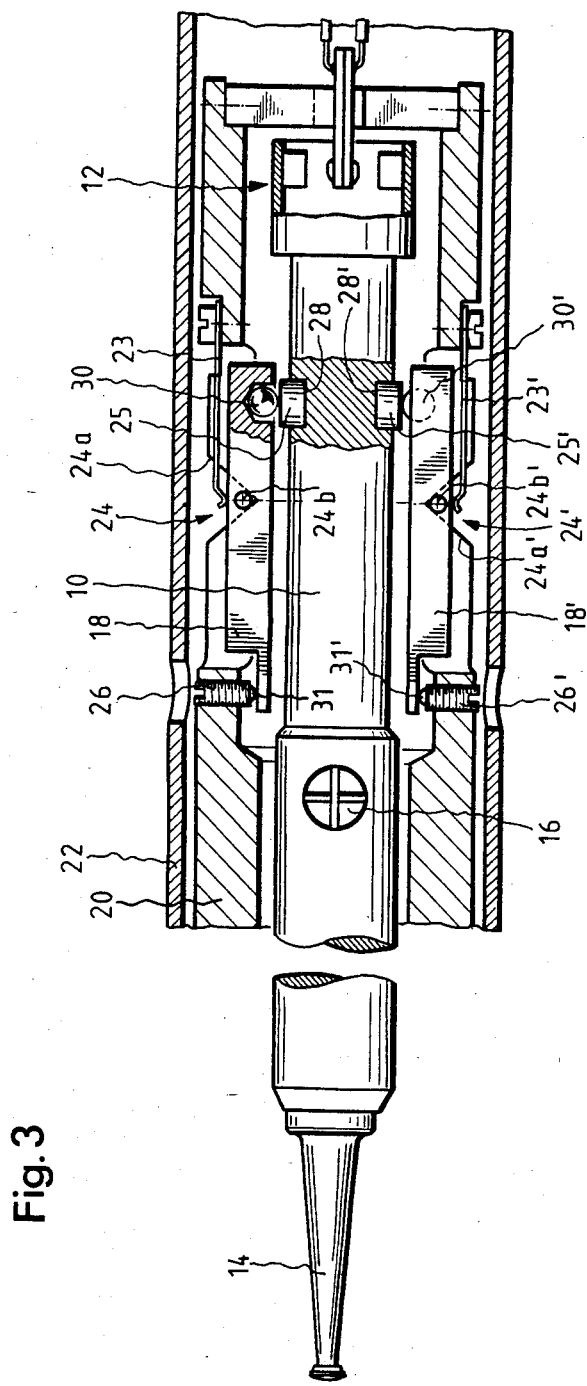
FIG. 3 schematically shows a first embodiment of the gear tooth test feeler according to the invention in which only the components of the gear tooth test feeler which are essential to the invention are shown.

Describing now the drawings, it is to be understood that to simplify the showing thereof only enough of the structure of the gear tooth measuring or test feeler has been illustrated therein as is needed to enable one skilled in the art to readily understand the underlying principles and concepts of this invention. Turning now specifically to FIG. 3 of the drawings, the apparatus illustrated therein by way of example and not limitation will be seen to comprise a sensing lever 10 carrying the movable component or portion of a measurement or measuring system 12, which may have the construction known from the aforementioned German Pat. No. 2,364,918, and German Pat. No. 3,302,016. Since the type of measuring system employed is not of significance for the gear tooth measuring or test feeler described here, a more detailed description of the measuring system is believed to be superfluous. Let it suffice to indicate that the measuring system transmits output signals of opposite algebraic signs for deflection of a feeler tip 14 in different directions, so that it can be readily determined whether a left hand or a right hand gear tooth flank is being sensed by the testing procedure.

In the gear tooth test feeler according to FIG. 3, the sensing lever 10 is provided with a pivot bearing means in the form of a cross-spring joint 16 known from the aforementioned German Pat. No. 2,364,918. The sensing lever 10 is shown in its central or neutral position in FIG. 3. The sensing lever 10 can be deflected out of this neutral position in a plane of deflection substantially coincident with the plane of the drawing in FIG. 3. Rocking levers 18 and 18' are provided on both sides of the sensing lever 10 substantially coincident with the deflection plane. The rocking levers 18 and 18' are illustrated in their initial position in which they maintain the sensing lever 10 in its central or neutral position. Since the construction of the gear tooth measurement or test feeler is symetrical in relation to a plane through the central axis of the sensing lever 10 and perpendicular to the plane of the drawing in FIG. 3, only the upper portion of FIG. 3 will be described in detail.

The gear tooth test feeler has a support housing or carrier or support member 20 surrounded by a protective housing or sleeve 22. The carrier or support member 20 is spaced from the sensing lever 10 and supports the outer ends of the cross-spring joint 16, so that the sensing lever 10 is pivotable about the cross-spring joint 16 within the carrier member 20. The rocking lever 18 is arranged in the region between the cross-spring joint 16 and this end of the sensing lever 10 adjacent to the measuring system 12. The rocking lever 18 is provided with a prismatic bearing which is generally designated with the reference numeral 24. This prismatic bearing 24 comprises a prism cut into the carrier member 20 in the form of two V-shaped notches. A pivot shaft 24b is fastened to the rocking lever 18 transverse to the longitudinal direction of the gear tooth test feeler. This pivot shaft 24b is journalled in the V-shaped notches of the prism comprised by the prismatic bearing 24, so that the rocking lever 18 is rotatable in counter-clockwise direction in FIG. 3 if the feeler tip 14 is deflected in counter-clockwise direction. A hold-down or retention spring 23 constructed as a leaf spring is screwed to the carrier member 20 at one of its ends and bears upon the rocking lever 18 above the pivot shaft 24b with its other end in order to retain the rocking lever 18 in the prismatic bearing 24.

A rotation or pivoting motion of the rocking lever 18 in clockwise direction is limited by a stop or stop member, which in the embodiment of FIG. 3 comprises an adjustable screw or threaded member 26 screwed into or threadedly joined to the carrier member 20. The rocking levers 18 and 18' are adjusted by the adjustment screws 26 and 26' into such an initial position that the sensing lever 10 is situated exactly in its central or neutral position. The adjustment screw 26' permits the rocking lever 18' to pivot or rock in the clockwise direction but prevents it from pivoting or rocking in the counter-clockwise direction.

The sensing lever 10 carries two magnets 25 and 25' in its region adjacent to those ends of each rocking lever 18 and 18' which are remote from the adjustment screws 26 and 26', respectively. The magnets 25 and 25', which are permanent magnets in the illustrated embodiment, may however also be electromagnets. The magnets 25 and 25' are simply installed in blind holes 28 and 28' with adhesive and protrude beyond the outer surface of the sensing lever 10 by equal amounts. Further blind holes are provided in the rocking levers 18 and 18' opposite the magnets 25 and 25' in each of which a non-magnetic ball 30 and 30', respectively, is arranged. The non-magnetic balls 30 and 30' protrude beyond those surfaces of each rocking lever 18 or 18' which are adjacent to the sensing lever 10 by a predetermined amount for a purpose to be explained in more detail in the following. Each ball 30 and 30' can be a polished ball of non-magnetic steel or a ceramic ball. The ends 31 and 31' with which the adjustment screws 26 and 26' contact the rocking levers 18 and 18' can also be spherically constructed or provided with a steel or ceramic ball, as indicated in FIG. 3.

Figure 1:
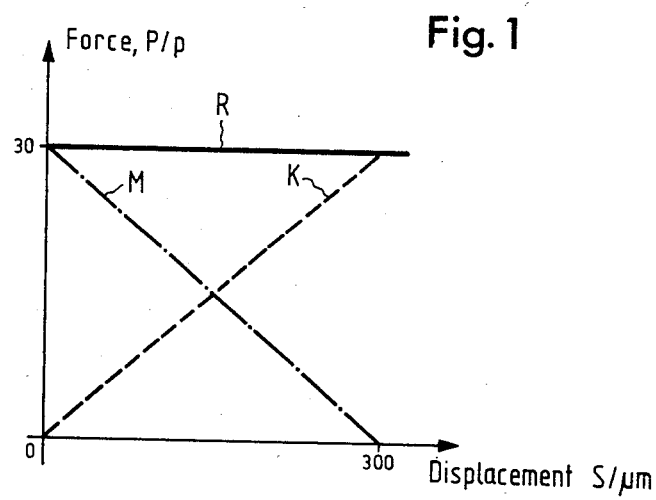
FIG. 1 schematically shows a diagram illustrating the dependence between contact force and deflection displacement path in a known gear tooth test feeler as well as in the gear tooth test feeler according to the present invention.

The amount by which the balls 30 and 30' protrude beyond the surface of the rocking levers 18 and 18' is selected such that the magnets 25 and 25' exert a force of attraction upon the ferrous rocking levers 18 and 18' whose further variation throughout the deflection displacement path is such that a force R which is constant over the deflection displacement path (cf. FIGS. 1 and 2) arises after even a minimal deflection of the sensing lever 10 from its central or neutral position through algebraic addition of the magnetic force of attraction and the counter-force exerted by the cross-spring joint 16. If the feeler tip 14 is, for instance, deflected upwardly in FIG. 3 during operation of the gear tooth test feeler, then the rocking lever 18' is pivoted or rocked in clockwise direction by the sensing lever 10 by the magnet 25' which bears against the ball 30'. Therefore, while the rocking lever 18' is entrained by the sensing lever 10 during its deflection, the other rocking lever 18 remains in its initial position. The magnet 25 therefore moves away from the rocking lever 18 and therefore exerts a progressively diminishing force of attraction upon the rocking lever 18. The variation of this magnetic force of attraction corresponds to the curve M in FIG. 1. As the sensing lever 10 increasingly pivots about the cross-spring joint 16, the counter-force generated by the cross-spring joint 16 increases. By appropriate selection of the magnets 25 and 25' and their spacing from the rocking levers 18 and 18' in their initial position and taking into consideration the counter-force generated by the cross-spring joint 16, a force equilibrium can be achieved which corresponds to the curve R, i.e. a substantially constant contact pressure of the feeler tip 14 upon a gear tooth flank can be achieved throughout the deflection displacement path.

In the embodiment shown in FIG. 3 the magnets 25 and 25' are mounted on the sensing lever 10 and the balls 30 and 30' are mounted on the rocking levers 18 and 18', respectively. The same operative effect would result if the magnets 25 and 25' were mounted on the rocking levers 18 and 18' and the balls 30 and 30' on the sensing lever 10. In this case it would only be necessary to fabricate the rocking levers 18 and 18' of non-magnetic material (e.g. brass) and to fabricate the sensing lever 10 from iron or other ferrous material instead of from a non-magnetic material (e.g. brass) or to provide then with a ferrous material in their regions adjacent the magnets 25 and 25'.

Figure 4:
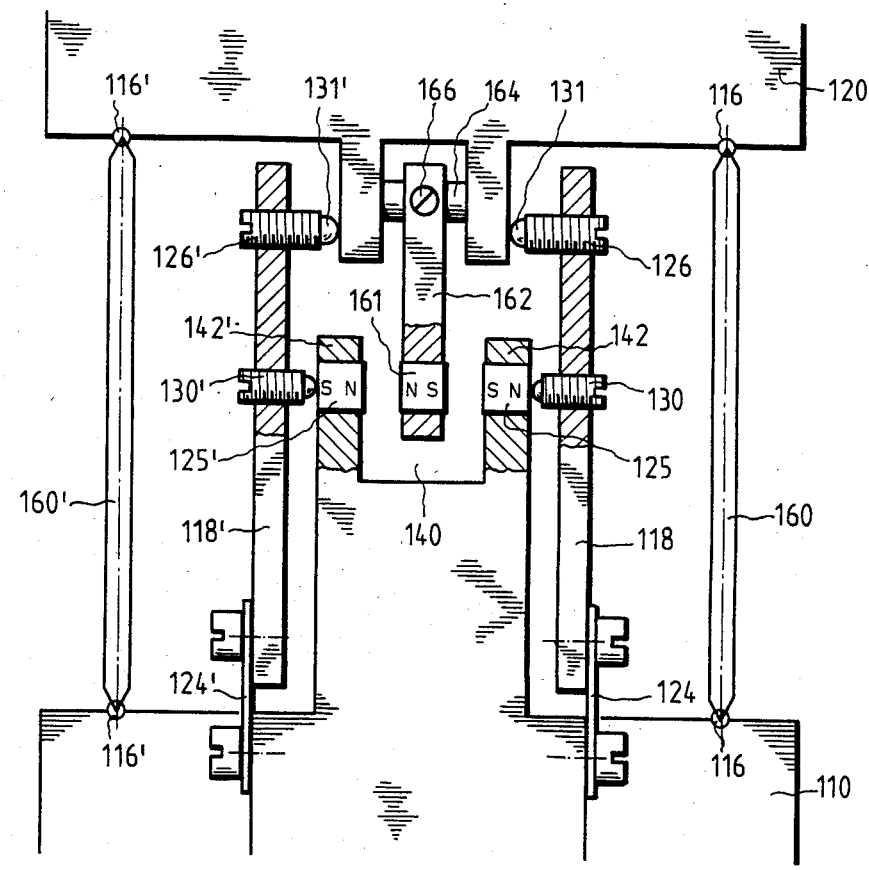
FIG. 4 schematically shows a second embodiment of the gear tooth test feeler according to the invention in which, as in FIG. 3, only the components of the gear tooth test feeler which are essential to the invention are shown and in which the measurement system has also been omitted for the sake of representational clarity.

FIG. 4 shows a second embodiment of the gear tooth test feeler in which the pivot bearing means for the sensing lever 10 comprises a parallelogram arrangement or 4-bar linkage having leaf springs 160 and 160' instead of a cross-spring joint. This parallelogram arrangement permits a relative motion between two components 110 and 120. For the sake of simplification of the following description it will be assumed that the component 110 represents the end of the sensing lever adjacent to the here not particularly shown measuring system and that the component 120 corresponds to a component of the carrier member and is therefore stationary. The feeler tip 14, which would therefore be situated at the lower portion of FIG. 4, is also not particularly shown. The four connection points of the leaf springs 160 and 160' with the sensing lever 110 and the carrier or support member 120 form pivot joints 116 and 116' which generate a slight counter-force when the sensing lever 110 is deflected out of the central or neutral position represented in FIG. 4.

The sensing lever 110 here also comprises non-magnetic material ( e.g. brass) and is provided with a recess 140 at that one of its ends represented in FIG. 4. Two magnets 125 and 125' are mounted diametrally opposite one another in two side walls 142 and 142' of the recess 140. Two rocking levers 118 and 118' are each mounted to the sensing lever 110 at their lower ends by leaf springs 124 and 124', respectively, as pivot bearing means, so that when the sensing lever 110 pivots or deflects, the leaf springs 124 and 124' also generate a counter-force which algebraically adds to the counter-force generated in the pivot joints 116 and 116'.

In the embodiment according to FIG. 4, non-magnetic pins 130 and 130' are provided instead of the balls 30 and 30' of the embodiment according to FIG. 3. Two threaded members or adjustment screws 126 and 126' are screwed into the rocking levers 118 and 118' and bear upon a portion of the carrier member 120.

If the feeler tip 14 not particularly shown in FIG. 4 is deflected in counter-clockwise direction, i.e. to the right in FIG. 4, then the sensing lever 110 participates in this deflection motion due to the pivot joints 116 and 116'. The spacing or distance between the magnet 125 and the rocking lever 118 remains unchanged because the sensing lever 110 entrains the rocking lever 118, which bears upon the magnet 125 through the pin 130. In contradistinction, the rocking lever 118 remains in its initial position because the adjustment screw 126' bears against the carrier member 120 with its end 131', while one of the magnets 125' moves away from the rocking lever 118'. The force of attraction exerted upon the rocking lever 118' by the magnet 125' diminishes as the deflection increases, so that the same equilibrium forces prevail as in the embodiment according to FIG. 3.

Should the counter-force generated by the pivot bearing means 116 and 116' and by the leaf springs 124 and 124' prove to be too low to produce a constant contact pressure of the feeler tip or finger 14 throughout the deflection region or path by algebraic addition to the force of attraction of one or the other of the magnets 125 and 125', then a compensation magnet 161 can be provided in the recess 140 between the two magnets 125 and 125'. The compensation magnet 161 is fastened to a support 162 made of brass or other non-magnetic material and support 162 which is translatably mounted upon a rail 164 fastened to the carrier or support member 120 and arrestable by an arresting or fixing screw 166. The compensation magnet 161 is arranged in line with the magnets 125 and 125' and is poled such that its poles each confront poles of the magnets 125 and 125' of the same magnetic sense (in the embodiment illustrated the magnets are poled SN-NS-SN from left to right as viewed in FIG. 4).

If, in the case previously described in relation to FIG. 4, the feeler tip 14 is deflected in counter-clockwise direction, then the magnet 125' moves away from the rocking lever 118' so that its force of attraction exerted upon the rocking lever 118' diminishes with increasing deflection. However, the magnet 125' simultaneously approaches the compensation magnet 161, which generates a compensating or counter-force which algebraically adds to the counter-force of the pivot joints 116 and 116' and of the leaf springs 124 and 124' and, with an appropriate selection of the magnets 125 and 125' and their mutual spacing, produces a contact pressure of the feeler tip 14 which is constant throughout the deflection region or displacement path.

The gear tooth test feeler according to FIG. 4 would operate in the same manner if the component 120 were mobile and were connected with the feeler tip or finger 14 and the component 110 were stationary.

Figure 2:
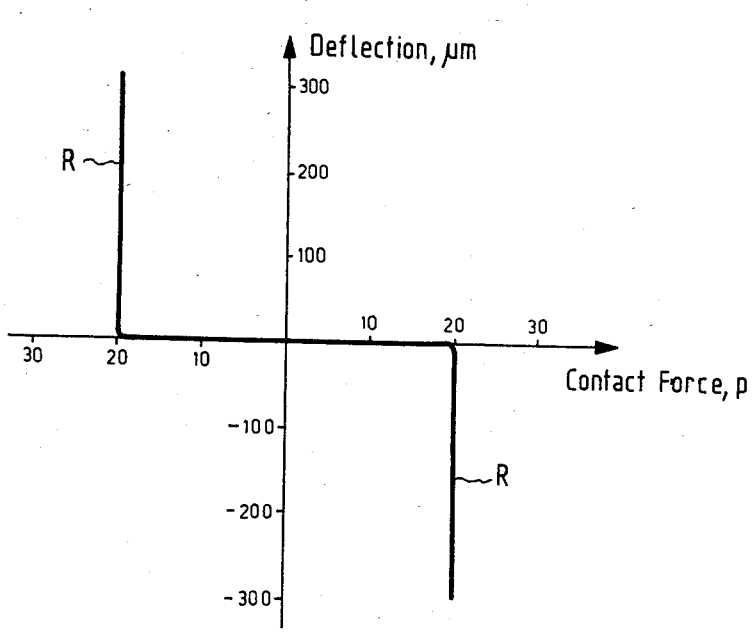
FIG. 2 schematically shows a measurement diagram which illustrates the feeler tip contact pressure in dependence of the deflection displacement path in the gear tooth test feeler according to the invention.

The measurement results illustrated in FIG. 2 were obtained with a gear tooth test feeler according to FIG. 3 in which the magnets 18 and 18' were of the type commercially available under the trademark "Vacomax 200" and had a diameter of 3 mm and a thickness of 1.5 mm, while the balls 30 and 30' were ceramic balls commercially available under the trademark "SRO".

While there are shown and described present preferred embodiments of the invention, it is to be distinctly understood that the invention is not limited thereto, but may be otherwise variously embodied and practiced within the scope of the following claims.

Accordingly, what I claim is:

1. A gear tooth test feeler for a gear tooth testing machine, comprising;

a sensing lever;

said sensing lever defining a plane of deflection and having a first end, a second end, an intermediate region adjacent said second end, a first side, a second side opposite said first side and a neutral position;

a feeler tip mounted on said first end;

a measuring system mounted on said second end;

a carrier member;

first pivot bearing means for deflectably mounting said sensing lever within said carrier member to perform a deflection substantially in said plane of deflection;

said first pivot bearing means being of a construction which generates a counter-force which increases substantially in proportion to said deflection of said sensing lever;

a first rocking lever;

a second rocking lever;

said first rocking lever being arranged on said first side substantially coincident with said plane of deflection and at said intermediate region of said sensing lever;

said second rocking lever being arranged on said second side substantially coincident with said plane of deflection and at said intermediate region of said sensing lever;

each of said first rocking lever and said second rocking lever having an initial position;

second pivot bearing means for said first rocking lever;

third pivot bearing means for said second rocking lever;

a first stop member for said first rocking lever;

a second stop member for said second rocking lever;

said first rocking lever being positioned between said carrier member and said sensing lever by said second pivot bearing means and said first stop member, and said second rocking lever being positioned between said carrier member and said sensing lever by said third pivot bearing means and said second stop member such that said first rocking lever and said second rocking lever maintain said sensing lever in said neutral position and such that when said sensing lever performs said deflection out of said neutral position, said sensing lever selectively either entrains said first rocking lever and leaves said rocking lever in said initial position thereof or entrains said second rocking lever and leaves first rocking lever in said initial position thereof;

a first magnet member;

a second magnet member; and said first magnet member and said magnet member being selectively both mounted on said sensing lever for exerting a magnetic force of attraction counter to said counter-force upon a respective one of said first rocking lever and said second rocking lever or being individually mounted on respective ones of said first rocking lever and said second rocking lever for exerting said magnetic force of attraction upon said sensing lever.

2. The gear tooth test feeler as defined in claim 1, wherein:

said first magnet member and said second magnet member are both mounted on said sensing lever;

said first rocking lever having a first portion adjacent said first magnet member;

said second rocking lever having a second portion adjacent said second magnet member; and at least said first portion and said second portion comprising ferrous material.

3. The gear tooth test feeler as defined in claim 2, wherein:

said first rocking lever and second rocking lever each comprise respective first and second spacer members; and said first and second spacer members respectively maintaining said first magnet member and said second magnet member and said first rocking lever and said second rocking lever at a small spacing from one another when said first rocking lever and said second rocking lever are in said initial positions thereof.

4. The gear tooth test feeler as defined in claim 3, wherein:

said first and second spacer members comprise non-magnetic ball members.

5. The gear tooth test feeler as defined in claim 3, wherein:

said first and second spacer members comprise non-magnetic pin members.

6. The gear tooth test feeler as defined in claim 3, wherein:

said first and second spacer members comprise ceramic material.

7. The gear tooth test feeler as defined in claim 1, wherein:

said first stop member comprises a first adjustable threaded member;

said second stop member comprises a second adjustable threaded member;

said first adjustable threaded member having a first end and a second end;

said second adjustable threaded member having a first end and a second end;

said first adjustable threaded member being threadedly joined at said first end thereof to said first rocking lever;

said second adjustable threaded member being threadedly joined at said first end thereof to said second rocking lever; and said first adjustable threaded member and said second adjustable threaded member both touching said carrier member when said first adjustable threaded member and said second adjustable threaded member are each in said initial position.

8. The gear tooth test feeler as defined in claim 7, wherein:

said second pivot bearing means comprises a first leaf spring;

said third pivot bearing means comprising a second leaf spring;

said first rocking lever having an end remote from said first adjustable threaded member;

said second rocking lever having an end remote from said second adjustable threaded member;

said first leaf spring connecting said remote end of said first rocking lever with said sensing lever; and said second leaf spring connecting said remote end of said second rocking lever with said sensing lever.

9. The gear tooth test feeler as defined in claim 1, wherein:

said first stop member comprises a first adjustable threaded member;

said second stop member comprises a second adjustable threaded member;

said first adjustable threaded member having a first end and a second end;

said second adjustable threaded member having a first end and a second end;

said first adjustable threaded member being threadedly joined at said first end thereof to said carrier member;

said second adjustable threaded member being threadedly joined at said first end thereof to said carrier member;

said first rocking lever being associated with said first adjustable threaded member and having an end adjacent thereto;

said second rocking lever being associated with said second adjustable threaded member and having an end adjacent thereto;

said first adjustable threaded member touching said adjacent end of said first rocking lever when said first rocking lever is in said initial position; and said second adjustable threaded member touching said adjacent end of said second rocking lever when said second rocking lever is in said initial position.

10. The gear tooth test feeler as defined in claim 1, further including:

a first pivot shaft mounted on said first rocking lever;

a second pivot shaft mounted on said second rocking lever;

a first retention spring;

a second retention spring;

said second pivot bearing means comprising a first prismatic bearing;

said third pivot bearing means comprising a second prismatic bearing;

said first prismatic bearing comprising a first pair of V-grooves formed in said carrier member;

said second prismatic bearing comprising a second pair of V-grooves formed in said carrier member;

said first pair of V-grooves accommodating said first pivot shaft;

said second pair of V-grooves accommodating said second pivot shaft;

said first retention spring retaining said first pivot shaft in said first pair of V-grooves; and said second retention spring retaining said second pivot shaft in said second pair of V-grooves.

11. The gear tooth test feeler as defined in claim 2, further including:

a compensation magnet member;

said second end of said sensing lever being provided with a recess;

said recess having a first side wall;

said recess having a second side wall opposite said first side wall;

said compensation magnet member being adjustably fastened to said carrier member;

said first magnet member being arranged in said first side wall and said second magnet member being arranged in said second side wall such that poles of opposite magnetic orientation confront one another across said recess; and said compensation magnet member being arranged between said first magnet member and said second magnet member in mutually spaced relationship thereto such that poles of like magnetic orientation immediately confront one another.

* * * * *